(12) United States Patent
Khan (10) Patent No.: US 9,185,089 B2
(45) Date of Patent: Nov. 10, 2015

(54) SYSTEM AND METHOD FOR KEY MANAGEMENT FOR ISSUER SECURITY DOMAIN USING GLOBAL PLATFORM SPECIFICATIONS

(75) Inventor: Ahmer A. Khan, Milpitas, CA (US)

(73) Assignee: Apple Inc., Cupertino, CA (US)

(*) Notice: Subject to any disclaimer, the term of this patent is extended or adjusted under 35 U.S.C. 154(b) by 115 days.

(21) Appl. No.: 13/332,201

(22) Filed: Dec. 20, 2011

(65) Prior Publication Data

US 2013/0159710 A1 Jun. 20, 2013

(51) Int. Cl.
*H04L 29/06* (2006.01)
*H04L 9/32* (2006.01)
*H04W 12/04* (2009.01)

(52) U.S. Cl.
CPC ............ *H04L 63/062* (2013.01); *H04L 9/3234* (2013.01); *H04W 12/04* (2013.01)

(58) Field of Classification Search
USPC ................ 713/150, 168; 380/277, 28, 30; 235/375, 380
See application file for complete search history.

(56) References Cited

U.S. PATENT DOCUMENTS

| | | | |
|---|---|---|---|
| 7,628,322 B2 | 12/2009 | Holtmanns et al. | |
| 7,699,233 B2* | 4/2010 | Pesonen | 235/492 |
| 7,805,611 B1* | 9/2010 | Montemayor et al. | 713/172 |
| 8,196,131 B1* | 6/2012 | von Behren et al. | 717/168 |
| 2005/0289085 A1* | 12/2005 | Hamber | 705/67 |
| 2008/0052772 A1* | 2/2008 | Conrado et al. | 726/10 |
| 2010/0023776 A1 | 1/2010 | Fedronic et al. | |
| 2010/0088518 A1* | 4/2010 | Dottax et al. | 713/175 |
| 2011/0255696 A1 | 10/2011 | Ma et al. | |
| 2011/0296182 A1* | 12/2011 | Jia et al. | 713/168 |
| 2012/0190354 A1* | 7/2012 | Merrien et al. | 455/422.1 |
| 2012/0291095 A1* | 11/2012 | Narendra et al. | 726/3 |
| 2012/0324552 A1* | 12/2012 | Padala et al. | 726/6 |

FOREIGN PATENT DOCUMENTS

| | | |
|---|---|---|
| KR | 2007055039 A | 5/2007 |
| WO | WO2010045821 | 4/2010 |

OTHER PUBLICATIONS

Aladdin Knowledge Systems Ltd. "Aladdin eToken NG-FLASH (Java), Aladdin eToken NG-FLASH, Anywhere, & Aladdin eToken NG-OTP (Java) FIPS 140-2 Cryptographic Module, Security Policy." Version 2.0 (Oct. 20, 2011) (Section 7.5).
PCT/US2012/058123. Int'l Search Report & Written Opinion (Feb. 28, 2013).

(Continued)

*Primary Examiner* — Aravind Moorthy
(74) *Attorney, Agent, or Firm* — Downey Brand LLP (57) ABSTRACT

Disclosed herein are systems, methods, and non-transitory computer-readable storage media for key management for Issuer Security Domain (ISD) using GlobalPlatform Specifications. A client receives from a server an authorization to update a first ISD keyset. The client encrypts, via a client-side secure element, a second ISD keyset with a server public key. The client sends the encrypted second ISD keyset to the server for updating the first ISD keyset with the encrypted second ISD keyset. Prior to updating, the client generates the first ISD keyset at a vendor and sends the first ISD keyset to the client-side secure element and sends the first ISD keyset encrypted with the server public key to the server. The disclosed method allows for updating of an ISD keyset of which only the client-side secure element and a server have knowledge.

26 Claims, 10 Drawing Sheets

(56) References Cited

OTHER PUBLICATIONS

B. Ozdenizci, V. Coskun, M. N. Aydin and K. Ok, "NFC Loyal: A Beneficial Model to Promote Loyalty on Smart Cards of Mobile Devices," 2010 International Conference for Internet Technology and Secured Transactions (ICITST), Nov. 8, 2010, pp. 1-6.

G. Madlmayr, O. Dillinger, J. Langer and Josef Scharinger, "Management of Multiple Cards in NFC-Devices," Smart Card Research and Advanced Applications, Lecture Notes in Computer Science, 2008, vol. 5189/2008, pp. 149-161.

ETSI: TS 102 622 V7.9.0. Smart Cards; UICC—Contactless Front-end (CLF) interface; Host Controller Interface (HCI) (Release 7). Technical specification, Mar. 2011. 55 pages.

ETSI: TS 102 613 V7.9.0. Smart Cards; UICC—Contactless Front-end (CLF) interface; Part 1: Physical and data link layer characteristics, (Release 7). Technical specification, Mar. 2011. 57 pages.

GlobalPlatform—Card Specification Version 2.2.1, GlobalPlatform, Mar. 2003. 237 pages.

GlobalPlatform Card—Confidential Card Content Management—Card Specification v 2.2—Amendment A, GlobalPlatform, Oct. 2007. 20 pages.

"ISO/IEC 7816-4:2005(E) Identification cards—Integrated circuit cards—Part 4: Organization, security and commands for interchange". Iso.org. second edition Jan. 15, 2005. 90 pages.

"ISO/IEC 7816-3:2006(E) Identification cards—Integrated circuit cards—Part 3: Cards with contacts—Electrical interface and transmission protocols". Iso.org. third edition Nov. 1, 2006, 58 pages.

ISO/IEC 28361:2007(E) Information technology—Telecommunications and information exchange between systems—Near Field Communication Wired Interface (NFC-WI). Iso.org. first edition Oct. 1, 2007. 24 pages.

A. Menezes, P. Van Oorschot, and S. Vanstone—"Chapter 12: Key Establishment Protocols", Handbook of Applied Cryptography; [CRC Press series on discrete mathematics and its applications], CRC Press, Boca Raton, FL, US, pp. 489-541; dated—Oct. 1, 1996.

A. Menezes, P. Van Oorschot, and S. Vanstone—"Chapter 13: Key Management Techniques", Handbook of Applied Cryptography; [CRC Press series on discrete mathematics and its applications], CRC Press, Boca Raton, FL, US, pp. 543-590; dated—Oct. 1, 1996.

Global Platform—"Global Platform Key Management System Functional Requirements", Nov. 1, 2003.

European Patent Application No. 12859018.9—Supplementary European Search Report dated Aug. 6, 2015.

Japanese Patent Application No. 2014-549034—Office Action dated Aug. 3, 2015.

\* cited by examiner

SYSTEM AND METHOD FOR KEY MANAGEMENT FOR ISSUER SECURITY DOMAIN USING GLOBAL PLATFORM SPECIFICATIONS

BACKGROUND

1. Technical Field

The present disclosure relates to encryption and more specifically to key management for Issuer Security Domain using the GlobalPlatform Specification.

2. Introduction

The GlobalPlatform Specification facilitates secure and interoperable management of applications on secure chips, including those embedded in smart cards, USB tokens and other secure elements. It is intended to protect valuable information such as encryption keys and sensitive data from theft or attack by an adversary. It applies to all platforms by defining application independent, hardware neutral and operating system neutral card components and interfaces and includes virtually every industry such as financial, education and commerce, as well as virtually every capable device type, such as smartphones, tablet computing devices, laptop computers, and so forth.

A secure element defined by the Global Platform Specification contains various security domains including an Issuer Security Domain, a Controlling Authority Security Domain and Supplemental Security Domain. The Issuer Security Domain has privileges for managing card content, card life cycle and application life cycle. Each of these security domains holds a set of symmetric and/or asymmetric encryption keys facilitating secure communication with a server. Processes with access to cryptographic keys for particular domains have access to the respective security domains.

Traditionally, cryptographic keys stored in an Issuer Security Domain are inserted at a vendor and subsequently provided to a trusted services manager (TSM) server. The TSM server then updates the cryptographic keys on the Issuer Security Domain. However the original cryptographic keys created by the vendor are used to encrypt new cryptographic keys. Encrypting new cryptographic keys with the original cryptographic keys known by the vendor is a potential security flaw within the GlobalPlatform Specification, in which an untrusted vendor could access the new cryptographic keys.

Currently, no cryptographic key management scheme exists which involves only a client such as a smart phone and a server for the Issuer Security Domain under the GlobalPlatform Specification.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Updating cryptographic keys without the use of a third party vendor can increase the security of the key management scheme. Disclosed are systems, methods, and non-transitory computer-readable storage media for key management for an issuer security domain using GlobalPlatform specifications. A mobile device such as a smart phone or tablet device can include a secure element implemented according to Global Platform Specifications that enables secure communication with a server, but the approaches set forth herein can operate with any device having a secure element. The secure element can have different levels of security domains including an Issuer Security Domain (ISD), a Controlling Authority Security Domain (CA SD) and a Supplemental Security Domain (SSD). An Issuer Security Domain can be a top-level security domain that manages other security domains, such as supplemental security domains that can include service provider security domains (SP SD). The Issuer Security Domain can manage at least one of card content, card life cycle and application life cycle. Access to a security domain is limited to processes with access to a cryptographic key for the security domain. A system implementing key management for issuer security domain using global platform specifications has two stages: pre-personalization at a smart card vendor and initialization during activation.

During the pre-personalization stage, the system generates, at a secure element vendor, an initial Issuer Security Domain encryption keyset. The system sends the initial Issuer Security Domain encryption keyset and a server public key to a secure element. The smart card vendor encrypts the Issuer Security Domain encryption keyset with the server public key and sends the encrypted initial issuer security domain keyset to the server for storage. Both the secure element at the client and the server store the initial Issuer Security Domain encryption keyset.

During activation, a system implementing key management for an issuer security domain using GlobalPlatform specifications activates a mobile device (client) such as a smart phone through a server by updating an existing initial encryption keyset for the client. The system receives authorization from the server to update a first Issuer Security Domain encryption keyset. The authorization can be based on an Issuer Security Domain encryption keyset initialization script generated at the server and/or based on an existing initial Issuer Security Domain encryption keyset. The system generates a second Issuer Security Domain encryption keyset within a secure element implementing Global Platform Card specifications at a client such as a smart phone and encrypts the second Issuer Security Domain encryption keyset with a server public key to yield an encrypted second Issuer Security Domain keyset. The client sends the encrypted second Issuer Security Domain keyset to the server for decryption using a corresponding server private key and updates the first Issuer Security Domain encryption keyset with the second Issuer Security Domain encryption keyset.

The disclosed method for key management for an Issuer Security Domain using Global Platform Specifications allows for updating cryptographic keys without the potential security risks involved in a third party vendor. The method enables updating without the use of cryptographic keys generated by a third party vendor. Thus, new cryptographic keys are known only to the client and the server allowing secure communication.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for key management for issuer security domain using global platform specifications. A system, method and non-transitory computer-readable media are disclosed which manages encryption keys for issuer security domain using global platform specifications. A brief introductory description of a basic general purpose system or computing device in FIG. 1 which can be employed to practice the concepts is disclosed herein. A more detailed description of key management will then follow.

Figure 1:
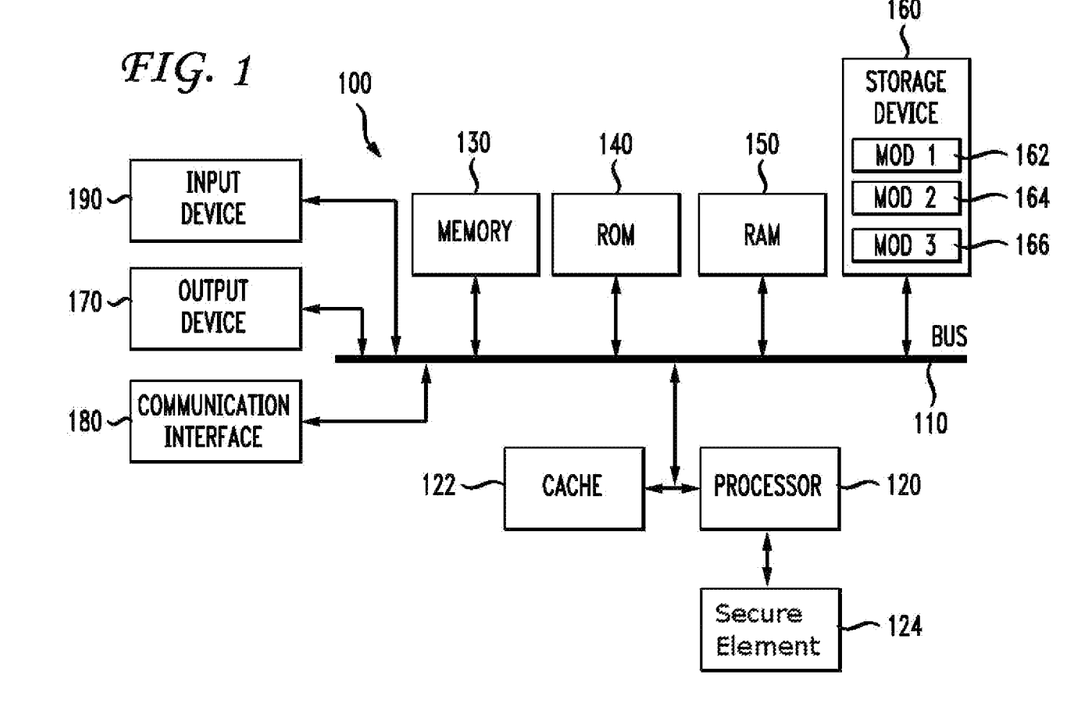
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. One exemplary other module is a secure element 124. The secure element 124 can be directly coupled to the processor 120 for security purposes, or can be configured to communicate with the processor 120 via a bus 110 or other communication mechanism. The secure element 124 can be an integrated circuit, such as a system on a chip or other single component or collection of components. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, output device 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the storage device 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some basic components and concepts of an exemplary computing device, the disclosure returns to a discussion of how to update cryptographic keys without the use of a third party vendor in order to increase the security of the key management scheme.

Figure 2:
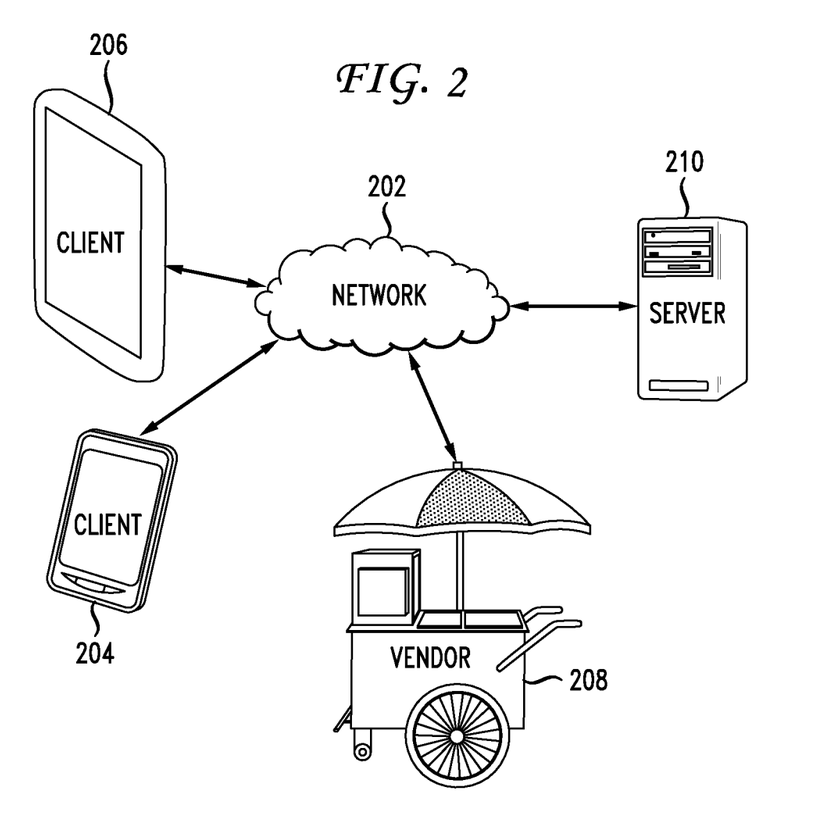
FIG. 2 illustrates an exemplary network configuration.

FIG. 2 illustrates a basic telecommunications network 202 with a first client such as a smartphone 204 having a secure element defined by GlobalPlatform Specifications, a second client 206 having a secure element defined by GlobalPlatform Specifications such as a mobile tablet device, a secure element vendor 208 and a company server 210. The smart phone 204 and tablet 206 can securely communicate with the company server 210 according to the GlobalPlatform standard using secure elements installed in the respective devices. The secure element vendor 208 can manufacture and/or sell secure elements for installing in mobile devices such as a smart phone 204 and tablet 206 and the company server 210 enables communication with a client for example a smart phone 204 and tablet 206. Alternatively, secure elements can be embedded within the client devices during assembly, manufacture, and/or configuration of the client devices. The exemplary telecommunications network 202 can be used with the GlobalPlatform standard and should not be limiting in any way. Any combination of clients, vendors, company servers, and/or other entities, such as local administration servers, proxies, and so forth (not shown), is contemplated. For example, a network having elements defined by Global Platform can have one client such as smartphone 204, one vendor 208 and one company server 210 or a network can have multiple clients, multiple vendors and multiple company servers. Alternately, a network can have a combination of clients, vendors and company servers some of which are defined by the GlobalPlatform Specification.

Figure 3:
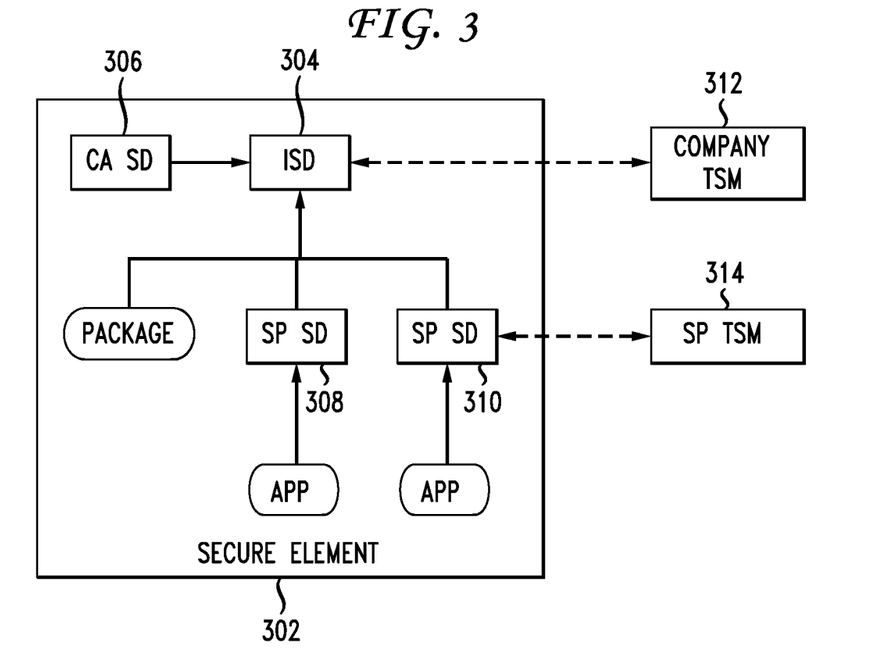
FIG. 3 illustrates a secure element defined by GlobalPlatform.

FIG. 3 illustrates a secure element 302 having various security domains defined according to GlobalPlatform Specifications. A secure element 302 can be a separate hardware component on a mobile device such as a smart phone and can enable secure communication with a server, or can be part of an integrated circuit (IC) or system on a chip (SoC). The secure element can include hardware and/or software components, but typically relies more on hardware implementations because hardware is not as easy to copy or modify as software. One device can incorporate multiple different secure elements for different purposes, which can operate in conjunction one with another or completely independently. The secure element 302 can store at least one cryptographic key relating to a security domain, and can store multiple cryptographic keys. In one implementation, each secure element has a unique cryptographic key. Access to a security domain is limited to processes with access to a cryptographic key for the respective security domain. Security domains can include an Issuer Security Domain 304, a Controlling Authority Security Domain 306, one or more service provider security domains 308 and 310. A company TSM 312 and a service provider TSM 314 are the owners of the security domains and own/possess corresponding cryptographic keys. The ISD has privileges for managing smartcard content, card life cycle and application life cycle. Cryptographic keys for the ISD can be held by company TSM 312. The CA SD can hold a public cryptographic key utilized in validating Service Provider Certificates loaded on the SP SD 308 and 310. The SP SD is created by the ISD however cryptographic keys are replaced by the SP TSM and then managed by the SP TSM. Privileges available to the SP SD can be limited to authentication, secure communication and provisioning of the application. The company TSM 312 can hold cryptographic keys to the ISDs of all secure elements deployed on mobile devices serviced by the company, or some defined subset thereof. Lastly, the SP TSM can hold cryptographic keys to the SP SD created and assigned to it, for example 308 and 310 are assigned to SP TSM 314.

Figure 4:
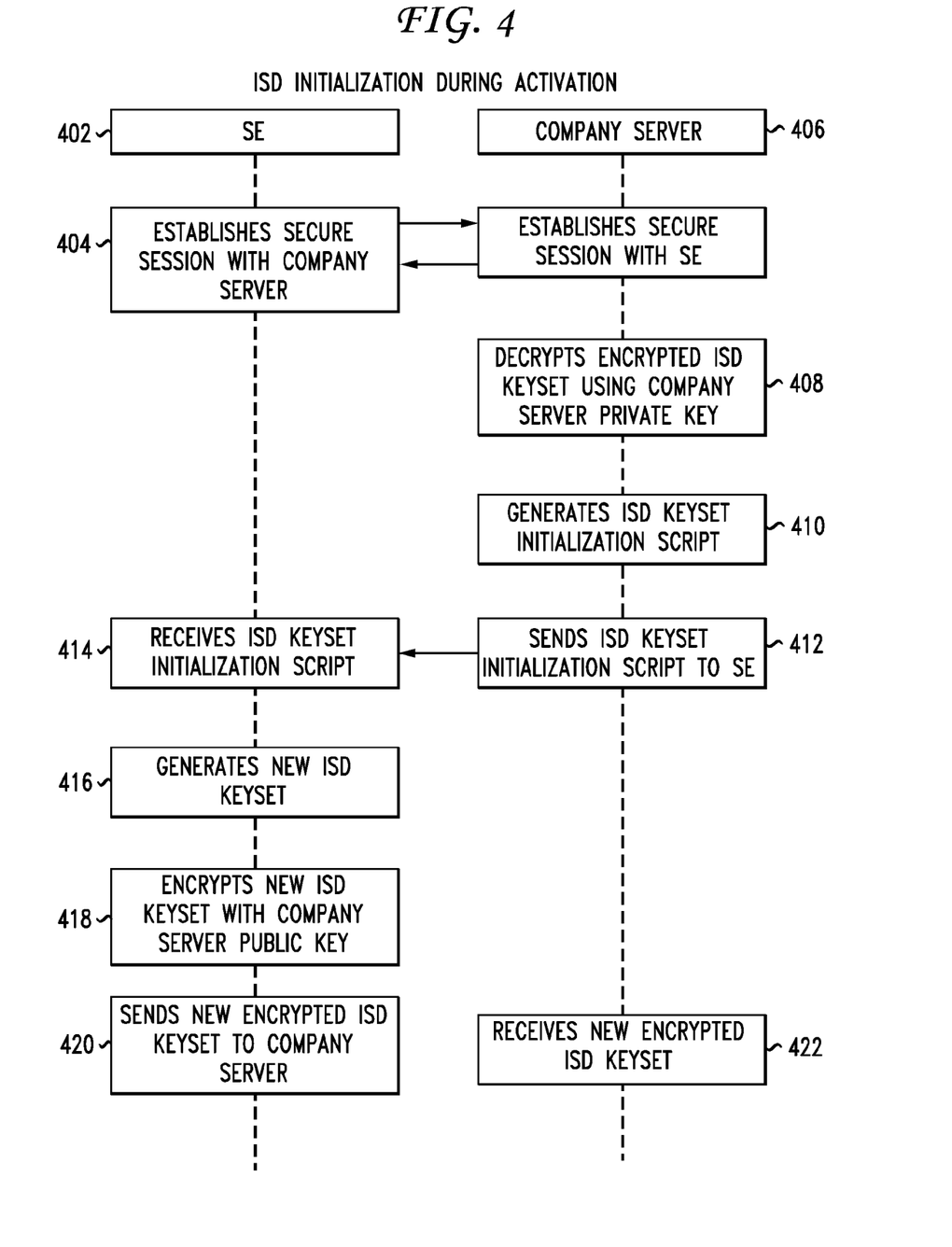
FIG. 4 illustrates ISD initialization during activation.
Figure 5:
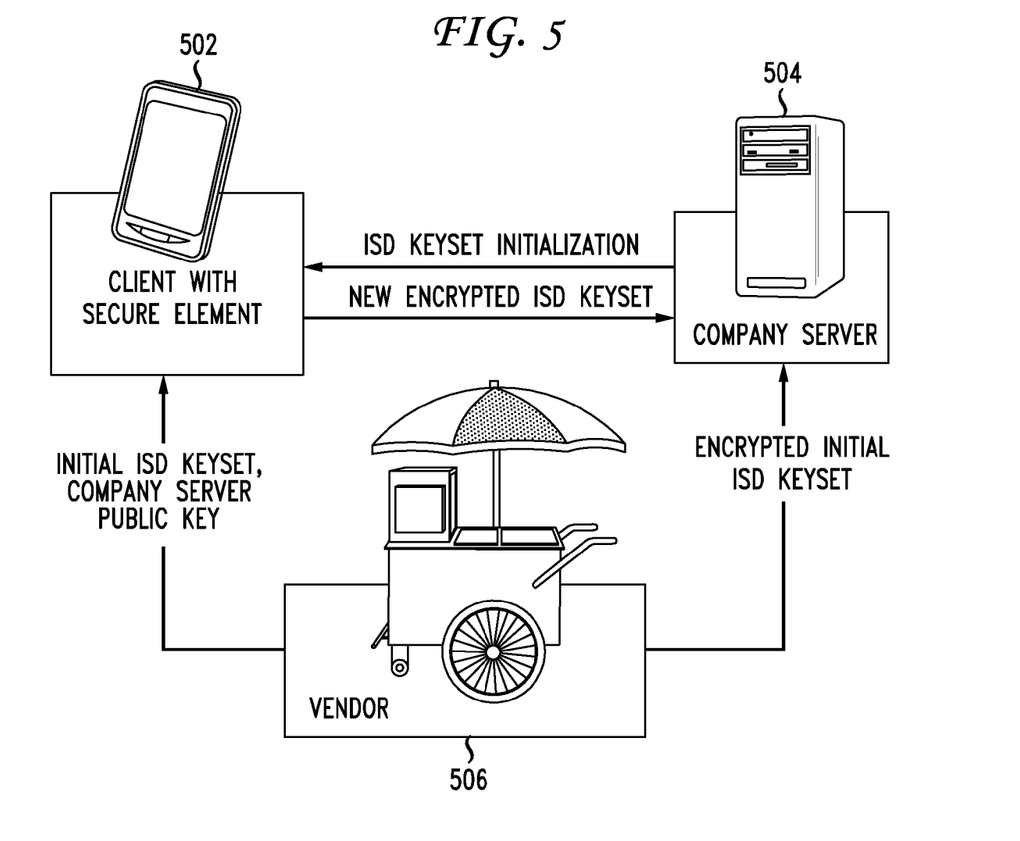
FIG. 5 illustrates an exemplary cryptographic key exchange.

FIGS. 4 and 5 illustrate an operational flow for initializing an ISD during activation of a client having a secure element 502 defined by the GlobalPlatform Specification, such as a smart phone. In these examples, the client contains the secure element, and the secure element does not communicate directly with the company server. The secure element communicates with the company server through the client. A secure element 402, 502 can establish a secure communication session 404 with company server 406, 504 for updating cryptographic keys. Company server 406 can decrypt an initial stored encrypted ISD keyset using a company private encryption key 408. The initial stored encrypted ISD keyset can be generated by a smart card vendor 506 and sent to company server 406, 504 for storage prior to initialization during activation. The company server 406 can generate an ISD keyset initialization script 410 based on the initial ISD keyset decrypted at the server. Next, the company server 406, 504 sends the ISD keyset initialization script 412 to the secure element 402, 502 on the smart phone. The secure element 402 within the client receives the ISD keyset initialization script 414 and generates a new ISD keyset based on the ISD keyset initialization script 416 sent by the company server 406. Secure element 402 encrypts the new ISD keyset with the company server public key 418 and sends, via the client, the new encrypted ISD keyset to the company server 420, 504. At the company server 406, 504, the new encrypted ISD keyset is received 422 and replaces the initial ISD keyset.

Initialization during activation is performed upon activation of a device. At this time, the initial ISD keyset is updated securely without the use of a secure element vendor. The new ISD keyset is known only to the secure element at a client device and the company server associated with the client device. Thus, this approach enables key management for Issuer Security Domain using GlobalPlatform specifications and updating cryptographic keys without involving a third party such as a vendor.

Key management for Issuer Security Domain using GlobalPlatform specifications utilizes public key cryptography for cryptographic key exchange between the client and the server. Public key cryptography utilizes asymmetric key algorithms and a pair of cryptographic keys for each entity. The pair of cryptographic keys includes a public key and a private key. The public key is publicly known and the private key is kept private. The security of public key cryptography depends on the security of the private key. For example, Alice and Bob can securely communicate with each other using public key cryptography. Alice can encrypt a message to Bob with Bob's public key which is publicly known. Anyone can send a message encrypted with Bob's public key to Bob because it is publicly known. However, only Bob can decrypt messages sent to him that were encrypted using his public key. Bob can receive the encrypted message from Alice and decrypt the message using his private key. Similarly, the client and server implementing key management for Issuer Security Domain using GlobalPlatform specifications can securely communicate using public key cryptography. As described herein, secure element 402 encrypts the newly generated ISD keyset with the company server public key 418 and sends the new encrypted ISD keyset to the company server 420, 504. The company server can decrypt the new ISD keyset because it has the corresponding private key. Utilizing public key cryptography allows a device with the secure element to securely communicate with a server.

Figure 6:
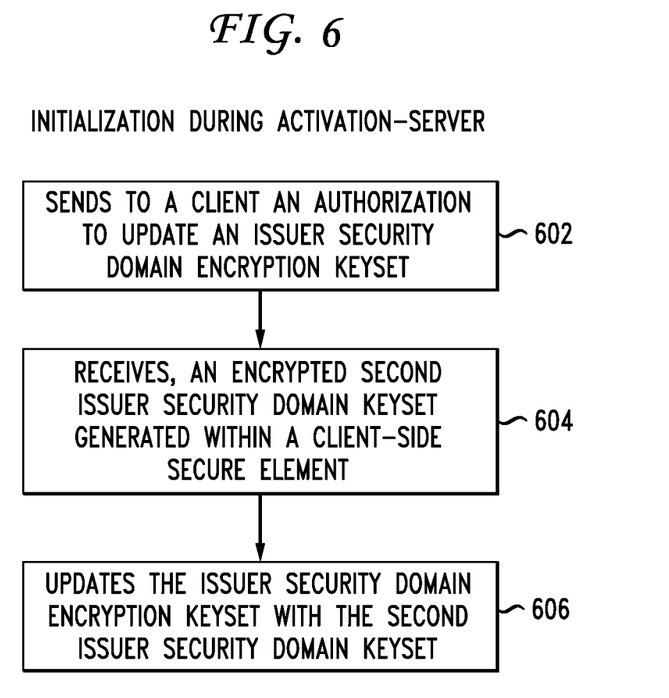
FIG. 6 illustrates an exemplary method embodiment for server initialization during activation.

The disclosure now turns to the exemplary method embodiments shown in FIGS. 6, 7, 9, and 10. For the sake of clarity, each of the methods is discussed in terms of an exemplary system 100 as shown in FIG. 1 configured to practice the respective methods. The steps outlined herein are exemplary and can be implemented in any combination thereof, including combinations that exclude, add, or modify certain steps. FIG. 6 illustrates a method embodiment of initialization during activation at a server. The server sends to a secure element enabled client an authorization to update an issuer security domain encryption keyset (602). An authorization to update an ISD keyset can be granted in the form of an authorization script. The authorization can be based on approaches defined in the GlobalPlatform standard or based on some other set of rules. Alternately, an authorization from the server can be granted to the client using tokens, keys or other forms. The server receives an encrypted second ISD keyset generated within a client-side secure element (604) and updates the ISD encryption keyset with the second ISD keyset generated at the client-side secure element (606).

Figure 7:
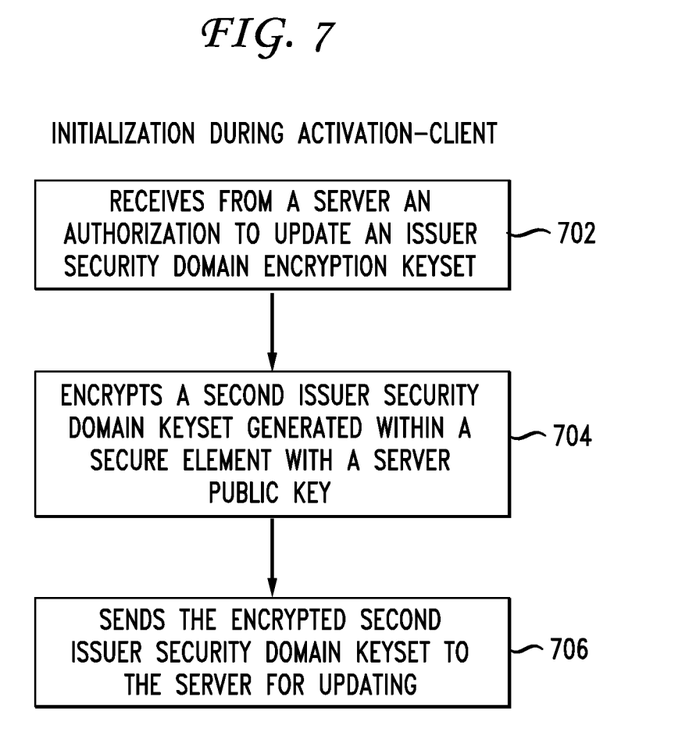
FIG. 7 illustrates an exemplary method embodiment for client initialization during activation.

FIG. 7 illustrates a method embodiment of initialization during activation at a client. The client receives from a server an authorization to update an issuer domain encryption keyset (702). The authorization to update an ISD keyset can be received in the form of an authorization script based on the initial ISD keyset generated at the server, or can be other forms of authorization such as tokens or keys. The client-side secure element encrypts a second ISD keyset generated within a secure element at the client with the server public key (704) and sends the encrypted second ISD keyset to the server for updating (706). The ISD keyset can be generated at the client-side secure element by a random or pseudorandom number generator for example, or can be generated in any other way. ISD keyset generation is not necessarily limited to a random or pseudorandom number generator.

Updating an ISD keyset in the manner disclosed herein allows only a client and a server access to the new ISD keyset. The traditional approach of updating an ISD keyset by encrypting a new ISD keyset with an initial ISD keyset allows a third party, for example the secure element vendor, access to the new ISD keyset, which relies on the assumption that the vendor is a trusted entity. Because the vendor generates the initial ISD keyset and sends it to both the client and the server, the vendor knows the initial ISD keyset. The traditional method of updating an ISD keyset involves the server encrypting the new ISD keyset with the initial ISD keyset. If the vendor gains access to the new ISD keyset encrypted with the initial ISD keyset, the vendor can decrypt the new ISD keyset and gain access to the new ISD keyset. The method described herein allows for updating of an ISD keyset using simply a client and a server, without relying on the third-party vendor from the process, thus creating a secure key management scheme. These approaches can be based on and/or operate within the GlobalPlatform specification, and may require slight departures from or additional requirements on top of the GlobalPlatform specification.

Figure 8:
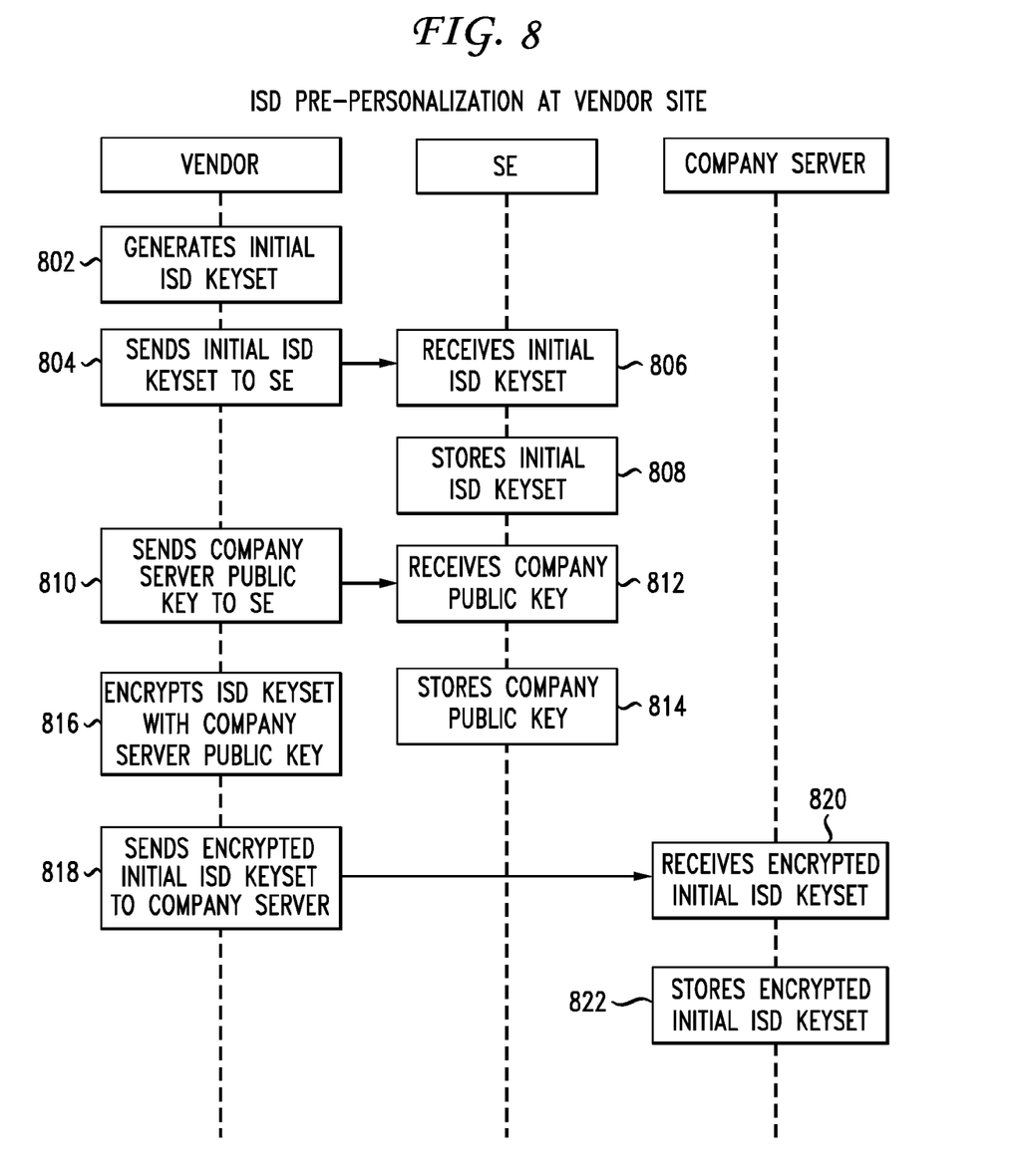
FIG. 8 illustrates ISD pre-personalization.

FIG. 8 illustrates ISD pre-personalization at a smart card vendor site. Typically, pre-personalization occurs first, which makes changing keys during activation possible. The same server public key that is stored during pre-personalization can be used during activation. Prior to initialization during activation, the system 100 performs ISD pre-personalization during which an initial ISD keyset is generated and loaded onto both a client and a server. ISD pre-personalization involves the vendor 506, the client having a secure element 502 and the company server 504. The vendor 506 generates an initial ISD keyset 802 and sends the ISD keyset to the secure element 804. The secure element 502 receives the initial ISD keyset 806 and stores the initial ISD keyset 808. The vendor 506 sends the company server 504 public key to the secure element 502, 810. The secure element 502 receives the company server public key 812 and stores the public key 814 of the company server for use in updating the initial ISD keyset during the initialization during activation stage. Next, the vendor 506 encrypts the initial ISD keyset with the company server public key 816 and sends the encrypted initial ISD keyset to the company server 818. Finally, the company server 504 receives the encrypted initial ISD keyset 820 and stores the encrypted initial ISD keyset for later use 822 in generating an authorization script for updating the ISD keyset.

Figure 9:
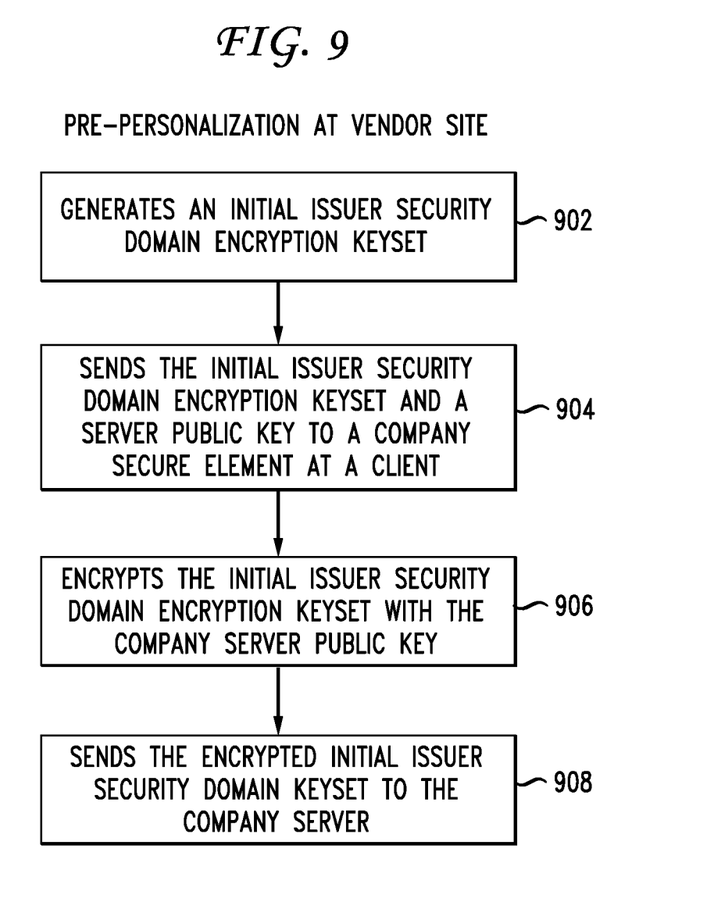
FIG. 9 illustrates an exemplary method embodiment for server ISD pre-personalization.

FIG. 9 illustrates an exemplary method for pre-personalization at a vendor site. The vendor 506 generates an initial ISD keyset (902) and sends the ISD keyset and a company server 504 public key to a secure element which can later be installed, manufactured, incorporated, plugged in to, or otherwise coupled with a client device (904) such as a smart phone or tablet. The vendor encrypts the initial ISD keyset with the company server public key (906) and sends the encrypted initial ISD keyset to the company server (908) for storage. The server 504 utilizes the initial ISD keyset when generating an ISD keyset initialization script for updating the ISD keyset.

Figure 10:
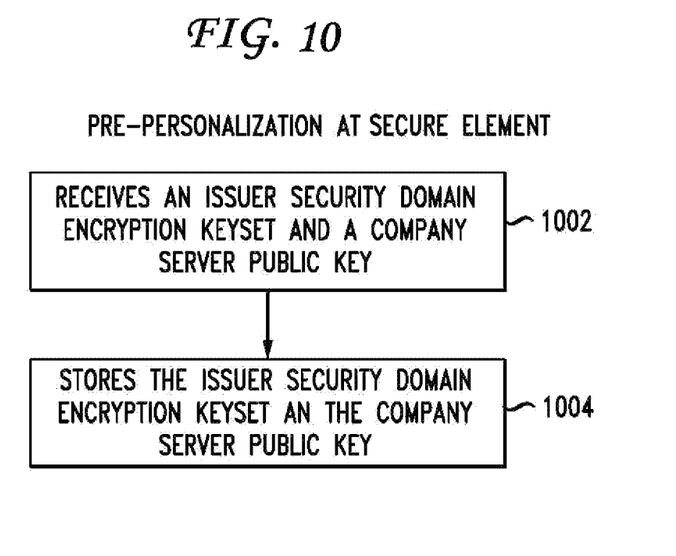
FIG. 10 illustrates an exemplary method embodiment for client ISD pre-personalization.

FIG. 10 illustrates an exemplary method for pre-personalization at a secure element enabled client. The client receives an ISD keyset and a company server public key (1002) and stores the ISD keyset and the company server public key (1004) for later use in initialization during activation. The pre-personalization phase of key management for Issuer Security Domain using GlobalPlatform establishes the initial ISD keyset within a network, while initialization during activation is performed when a secure element is placed in a smart phone for example and updates the initial ISD keyset with a new ISD keyset known only to the client and server. Key management for Issuer Security Domain using GlobalPlatform allows for secure communication between a client having a secure element and a company server.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to mobile devices other than smart phones such as a tablet having a secure element defined by GlobalPlatform. Those skilled in the art will readily recognize various modifications and changes that may be made to the principles described herein without following the example embodiments and applications illustrated and described herein, and without departing from the spirit and scope of the disclosure.

I claim:

1. A method, comprising:
    receiving, at a client device and from a server, an authorization to update a first Issuer Security Domain (ISD) encryption keyset at the server;
    generating, via a secure element on the client device, a second ISD keyset that is to be used to update the first ISD encryption keyset at the server;
    encrypting, via the secure element on the client device, the second ISD keyset with a server public key to yield an encrypted second ISD keyset; and
    sending the encrypted second ISD keyset to the server for updating the first ISD encryption keyset at the server with the second ISD keyset, wherein the second ISD keyset replaces the first ISD encryption keyset at the server, and the second ISD keyset is known only to the server and the secure element.

2. The method of claim 1, wherein the secure element comprises at least one security domain, and the at least one security domain is one of an Issuer Security Domain, a Controlling Authority Security Domain,. and a Supplemental Security Domain.

3. The method of claim 2, wherein the Issuer Security Domain is a top level security domain that manages at least one other domain.

4. The method of claim 3, wherein the Issuer Security Domain manages at least one of card content, card life cycle and application life cycle.

5. The method of claim 1, wherein the secure element is implemented according to Global Platform Card specifications, and the second ISD keyset is not based upon an encryption key received from a third party vendor.

6. The method of claim 1, wherein the secure element stores at least one cryptographic key relating to a security domain.

7. The method of claim 6, wherein access to a security domain is limited to processes having access to a cryptographic key for the security domain.

8. The method of claim 1, wherein the secure element comprises a dedicated hardware component within the client device.

9. The method of claim 8, wherein the server communicates with the secure element via the client device.

10. The method of claim 8, wherein the authorization is issued during an initial activation of at least one of the client device and an application.

11. A method, comprising:
    sending, from a server to a client device, an authorization to update a first Issuer Security Domain (ISD) encryption keyset;
    receiving, at the server from the client device, an encrypted second ISD keyset, wherein a second ISD keyset is generated within a client-side secure element, and the second ISD keyset is encrypted within the client-side secure element to yield the encrypted second ISD keyset; and
    updating the first ISD encryption keyset at the server with the second ISD keyset, wherein the second ISD keyset replaces the first ISD encryption keyset, and the second ISD keyset is known only to the server and the client-side secure element.

12. The method of claim 11, wherein the client-side secure element is implemented using Global Platform Card specifications, and the second ISD keyset is not based upon an encryption key received from a third party vendor.

13. The method of claim 11, wherein the authorization is based on an Issuer Security Domain keyset initialization script generated at the server, and the initialization script is based on an existing encrypted Issuer Security Domain keyset.

14. The method of claim 13, wherein the existing encrypted Issuer Security Domain keyset is decrypted at the server using a server private encryption key prior to sending the authorization.

15. The method of claim 11, wherein the encrypted second ISD keyset is encrypted using a server public encryption key that corresponds to a server private encryption key.

16. A system, comprising:
a processor;
a memory configured to store computer executable instructions that, when executed by the processor, cause the system to:
generate, at a vendor, an Issuer Security Domain (ISD) encryption keyset;
send the ISD encryption keyset and a server public key to a secure element at a client device, wherein the secure element implements at least a portion of Global Platform Card specifications;
encrypt, at the vendor, the ISD encryption keyset with the server public key to yield an encrypted ISD keyset; and
send the encrypted ISD keyset to a server,
wherein an existing ISD encryption keyset at the server is updated securely with a new ISD keyset generated by the secure element without the use of the vendor, and the new ISD keyset is known only to the secure element and the server.

17. The system of claim 16, wherein the secure element comprises a dedicated hardware component within the client device.

18. The system of claim 17, wherein the server services at least one secure element within the client device identified by a element identification component.

19. The system of claim 18, wherein each secure element has a different ISD encryption keyset identified by the secure element identification component.

20. A non-transitory computer-readable storage medium configured to store instructions that, when executed by a client device, cause the client device to perform steps comprising:

receiving, at the client device, an Issuer Security Domain (ISD) encryption keyset and a server public key, wherein the ISD encryption keyset is generated at a vendor, and the client device includes a secure element;
storing the ISD encryption keyset and server public key at the client device; and
generating, via the secure element, a new ISD keyset that is to be used to update an existing ISD keyset at a server, wherein the existing ISD keyset at the server is updated securely with the new ISD keyset without the use of the vendor, and the new ISD keyset is known only to the secure element and the server.

21. The non-transitory computer-readable storage medium of claim 20, wherein the secure element has at least one security domain, and the at least one security domain is one of an Issuer Security Domain, a Controlling Authority Security Domain and a Supplemental Security Domain.

22. The non-transitory computer-readable storage medium of claim 20, wherein the secure element comprises an embedded chip within the client device.

23. The non-transitory computer-readable storage medium of claim 20, wherein the secure element is implemented according to Global Platform specifications.

24. The non-transitory computer-readable storage medium of claim 20, wherein the ISD encryption keyset is generated as part of a pre-personalization stage.

25. A non-transitory computer-readable storage medium storing instructions that, when executed by a computing device, cause the computing device to perform steps comprising:
generating, at a vendor, an Issuer Security Domain (ISD) encryption keyset;
sending the ISD encryption keyset and a server public key to a secure element embedded within a client device;
encrypting, at the vendor, the ISD encryption keyset with the server public key to yield an encrypted ISD keyset; and
sending the encrypted ISD keyset to a server, wherein an existing ISD encryption keyset at the server is updated securely with a new ISD keyset generated by the secure element without the use of the vendor, and the new ISD keyset is known only to the secure element and the server.

26. The non-transitory computer-readable storage medium of claim 25, wherein the secure element implements at least a portion of Global Platform Card specifications.

* * * * *